United States Patent Office 2,854,496
Patented Sept. 30, 1958

2,854,496

PROCESS FOR THE CATALYTIC HYDROGENATION OF UNSATURATED HYDROCARBONS AND THEIR DERIVATIVES

Leon W. Wright, Wilmington, Del., assignor to Houdry Process Corporation, Wilmington, Del., a corporation of Delaware No Drawing. Application August 31, 1953
Serial No. 377,669

14 Claims. (Cl. 260—683.9)

The present invention relates to the hydrogenation of unsaturated hydrocarbons and other unsaturated organic compounds in the presence of catalysts and of added free hydrogen, and it is more particularly concerned with the use of alkali metal hydrides and alkaline earth metal hydrides as the catalysts in such hydrogenation processes.

It has previously been proposed to treat high-molecular weight organic materials, such as tars, pitch, coal and petroleum distillates, mineral oils, hydrocarbons and hydrocarbon derivatives, their raw materials and distillation residues with hydrogen under high pressure and at elevated temperature in the presence of hydrides of alkali metals or alkaline earth metals to form compounds of molecular weight, and it has also been proposed to hydrogenate naphthalene and anthracene in the presence of sodium hydride at a hydrogen pressure of 10–20 kg./sq. cm. and a temperature of 230–250° C. The usefulness of such metal hydrides as true catalysts in hydrogenating operations was believed to be restricted to this type of hydrocarbon compounds, and particularly to polycyclic and heterocyclic unsaturated compounds, and it was considered impossible to hydrogenate in this manner unsaturated hydrocarbons with normal double bonds, such as olefins. It has also been proposed to hydrogenate ethylene in the presence of metallic calcium, in which case, it was believed that the metal itself functioned as the catalyst in converting ethylene to ethane.

It has now surprisingly been found that hydrogenation of such unsaturated organic compounds, which were previously considered to be unsuitable for hydrogenating treatment in the presence of the hydrides of alkali metals and alkaline earth metals as catalysts, such as olefins for example, can be accomplished, obtaining good yields of product if the metal hydride catalysts employed apart from the metal hydride itself also contain in the free state a portion of the same metal. To obtain the desired activity, it has been found that the mixture of free metal and hydride has to be very intimate and homogeneous, such intimate and homogeneous mixture may be achieved, for example, by preparing the metal hydride from the free metal and hydrogen under suitable conditions in such a manner that not all of the free metal is used for the formation of the hydride thereof, but very fine particles of this metal remain in the free state intermixed with the metal hydride particles formed. Still better results are obtained if the metal hydride prepared in the usual manner is evacuated before its use as hydrogenation catalyst for an extended period, say over night, preferably at elevated temperature. In other words, it has been found that the activity of a metal hydride as hydrogenation catalyst is substantially increased by depriving commercial hydride of some of the free or released hydrogen. In accordance with the invention, therefore, hydrogenation is effected in the presence of catalyst comprising hydrogen-deficient alkali metal hydrides or alkaline earth metal hydrides.

One object of the present invention is to hydrogenate unsaturated organic compounds, particularly such which contain normal double bonds between carbon atoms, such as olefins, in the presence of specially prepared or treated alkali metal hydrides or alkaline earth metal hydrides and with the addition of hydrogen.

It is another object of this invention to use as catalysts in the hydrogenation of unsaturated organic compounds hydrides of alkali metals or alkaline earth metals which are deficient in hydrogen or of such hydrides which contain the corresponding metal also in the free state and in most intimate and homogeneous mixture of the smallest particles of both substances.

It is a further object of this invention to use as catalysts in the hydrogenation of unsaturated hydrocarbons the hydrides of barium or calcium evacuated for a sufficient period before use, preferably at an elevated temperature.

Other objects and advantages of the invention appear from the following specification and claims.

While the activity of the alkali metal hydrides is generally only rather limited in the hydrogenation of unsaturated organic compounds, such as olefins, with molecular hydrogen, the activity of the alkaline earth metal hydrides, $CaH_2$, $BaH_2$ and $SrH_2$, and particularly that of calcium hydride and barium hydride as catalysts in such processes is very high. These are active over a wide temperature range and at low as well as high pressures. Thus, it is possible, for example, to carry out hydrogenation in the presence of alkali or alkaline earth metal hydride catalysts over a wide temperature range of up to about 400° C. and at a pressure range of 1 to 50 atmospheres, certain of these metal hydrides showing acceptable activity at temperatures as low as 0° C. and being thermally stable under a hydrogen pressure of 1 atm. at least up to 400° C. The alkaline earth metal hydrides are particularly stable to heat while the alkali metal hydrides, with the exception only of lithium hydride, are considerably less stable to heat but still have acceptable stability.

The capacity of barium hydride to activate molecular hydrogen is substantially higher than that of calcium hydride, and in both cases the hydrogen-deficient hydride has proved to be substantially more active than the respective commercial hydride or that prepared in situ in the presence of excess hydrogen.

The activation of hydrogen by calcium hydride and by barium hydride has been investigated not only in the hydrogenation of unsaturated hydrocarbons, but also with the use of the hydrogen-deuterium exchange method. In this latter investigation, commercial calcium hydride was found to be inactive for hydrogen-deuterium exchange at 100° C. If, however, this catalyst had been pumped in a vacuum over night at a temperature of 200° C., it was found to be active for hydrogen-deuterium exchange down to a temperature of 0° C. The temperature of the evacuation of the calcium hydride should be at least 100° C. and is preferably 150° C. or somewhat higher. For barium hydride even lower temperature for the evacuation is acceptable. With identical vacuum pretreatment, barium hydride of commerce was found to be active down to a temperature −78° C. and to be about as active at 0° C. (measured by loss of deuterium from the gas phase) as similarly pretreated calcium hydride was at 150° C. These results are shown in Table I.

TABLE I

*Hydrogen-deuterium exchange[1] over calcium and barium hydrides*

| Temp., °C. | Calcium Hydride Gas Analysis (Mole percent) | | | Temp., °C. | Barium Hydride Gas Analysis (Mole percent) | | |
|---|---|---|---|---|---|---|---|
| | Percent $H_2$ | Percent $D_2$ | Percent HD | | Percent $H_2$ | Percent $D_2$ | Percent HD |
| 200 | 47.7 | 10.4 | 41.9 | 200 | 94.0 | 0.4 | 5.6 |
| 150 | 30.4 | 21.7 | 47.9 | | | | |
| 100 | 27.4 | 24.8 | 47.8 | 100 | 70.2 | 3.3 | 26.5 |
| 50 | 27.0 | 25.8 | 47.2 | | | | |
| 0 | 35.1 | 33.8 | 31.1 | 0 | 30.4 | 22.4 | 47.2 |
| 200 | 41.5 | 13.7 | 44.8 | −78 | 29.3 | 24.9 | 45.8 |

[1] Equilibrium was reached in all cases (within experimental error) except at 0° C. for calcium hydride. A one hour contact time was used. $H_2$–$D_2$ charge 48.8–50.5 for calcium hydride, 49.9–49.3 for barium hydride—HD 0.7% in both cases.

The data given in Table I also indicate that hydride ions (deuteride ions) diffuse rapidly from the surface to the bulk at temperatures from 200° down to about 0° in the case of the barium hydride, whereas the same effect is noticeable in calcium hydride only at temperatures from 200° to 150° C. From these considerations it is to be concluded that barium hydride, barring gross differences in surface area, has a catalytic activity several orders of magnitude greater than that of calcium hydride. Corresponding results show in the hydrogenation of olefins and the like, as will be seen from Table II.

TABLE II

*The hydrogenation of ethylene[1] over calcium[2] and barium[3] hydrides*

| Run | Catalyst Hydrides | Temp., °C. | Sample Taken After (min.) | Gas Analysis (Mole percent) | | |
|---|---|---|---|---|---|---|
| | | | | Percent $C_2H_6$ | Percent $C_2H_4$ | Percent $H_2$ |
| 1 | Calcium | 200 | 150 | 71.6 | 11.0 | 17.6 |
| 2 | do | 150 | 420 | 92.9 | 0.9 | 5.4 |
| 3 | do | 25 | Inactive | | | |
| 4 | Barium | 200 | 30 | 75.1 | 23.9 | 0.5 |
| 5 | do | 100 | 25 | 78.8 | 20.4 | 0.3 |
| 6 | do | 0 | 210 | 75.5 | 22.2 | 2.3 |

[1] Charge analysis: 51.8% $H_2$—48.2% $C_2H_4$ for calcium hydride, 42.0% $H_2$—55.8% $C_2H_4$—1.6% $C_2H_6$ for barium hydride.
[2] Calcium hydride evacuated at 200° C.
[3] Barium hydride evacuated at 200° C.

Table II shows that while calcium hydride is still inactive at a temperature of 25° C., the catalytic hydrogenating activity of barium hydride at a temperature of 0° C. is about as high as that of calcium hydride at about 150–200° C.

The activity of both these hydrogen-deficient hydride catalysts for olefin hydrogenation has also proved to be substantially higher than that of the free metals. In hydrogenating ethylene over calcium hydride (prepared in situ from metallic calcium) the reaction proceeded 25 to 30 times faster, under otherwise identical conditions, than over calcium metal.

On using the hydrogen-deficient metal hydride catalysts for the hydrogenation in flow-systems, it has been found that superior results are obtained with the employment of low or relatively low space velocities, as shown by the following examples.

EXAMPLE I

When the hydrogenation of ethylene was carried out in a flow-system over evacuated calcium hydride at a temperature of 200° C., with the charge gas comprising 42% $H_2$ and 56% $C_2H_4$, the velocity of hydrogenation dropped off rapidly with increasing space velocity. While a yield of about 72.5% ethane was obtained at about 40 v./v./hr. (volumes gas at S. T. P./volume catalyst/hour), the yield had dropped to about 10% at about 382 v./v./hr. The employment of space velocities in the range of 30–50 v./v./hr. and of temperatures in the range of of about 50–400° C. are well suited for practical operation. At a space velocity of 40 v./v./hr., the calcium hydride showed good stability over a run of six hours and more, while a chromia-alumina catalyst used in a comparative run under the same conditions became inactive after two hours on stream.

Corresponding results as with the calcium hydride catalyst are obtained with the use of the hydrogen-deficient barium hydride, as shown by the following example.

EXAMPLE II

The barium hydride employed was evacuated over night at a temperature of 200° C. and the vacuum was then broken with helium. A mixture comprising 42% $H_2$ and 56% $C_2H_4$ was charged to the reactor at a temperature of 200° C. and at the lowest space velocity employed in this example, i. e. at 386 v./v./hr. During a three hour run the space velocity was increased up to 1460 v./v./hr., and gas samples were taken after each hour. While at the lowest space velocity employed a yield of 70% ethane was obtained (from a mixture of the composition employed a maximum yield of about 75% ethane could have been expected), the velocity of the hydrogenation here again dropped off rapidly with increasing space velocity, and a yield of about 40% ethane only was obtained at 1460 v./v./hr.

A comparison of the results of Examples I and II has shown that with evacuated barium hydride a conversion of ethylene to ethane can be obtained at 850 v./v./hr. about as high as that which is obtained with evacuated calcium hydride at about 40 v./v./hr. At a temperature of 100° C. and even at 0° C. nearly complete conversion of ethylene to ethane could also be obtained with evacuated barium hydride, though in the latter case the conversion was slower. For practical purposes, therefore, in the case of the use of barium hydride catalyst space velocities in the range of 350–900 v./v./hr. and temperatures of 0° to 400° C. are recommended.

Although there is no certainty in the explanation for the large decrease in the ethylene conversion at the high space velocities according to the examples, it is well possible that this decrease may be due, at least in part, to traces of water carried through the drying tower at high space rates. It is a known fact that alkali metal and alkaline earth metal hydrides are very sensitive to polar compounds having labile hydrogen, such as water, alcohol, and the like. It is, therefore, of considerable importance to avoid any traces of water and other polar compounds which would liberate hydrogen from the metal hydrides on contact therewith.

EXAMPLE III

When isobutylene was treated with hydrogen in the presence of evacuated calcium hydride in a corresponding manner as indicated for the treatment of ethylene in Example I, the following results were obtained: A charge gas mixture comprising 54.1% of hydrogen and 45.9% of isobutylene was treated over a calcium hydride catalyst which had been pretreated by evacuation at 200° C. On operating at a hydrogenation temperature of 150° C., a gas sample taken after two hours on product analysis showed a volume content of 72.6% iso-$C_4H_{10}$, 13.5% iso-$C_4H_8$ and 13.9% $H_2$; while at a treating temperature of 200° C. a gas sample taken after four hours had a volume content of 57.7% iso-$C_4H_{10}$, 17.3% iso-$C_4H_8$ and 23.3% $H_2$, and a sample taken after eight hours had a volume content of 61.7% iso-$C_4H_{10}$, 18.9% iso-$C_4H_8$ and 19.2% $H_2$.

Respectively, corresponding results are obtained in the hydrogenating treatment of other unsaturated hydrocarbons with the use as catalysts of hydrides of alkali metals and alkaline earth metals generally, and with similar indication of the superiority of the hydrogen-deficient hydrides; particularly those of barium and calcium. Unsaturated hydrocarbon compounds which contain still other elements or groups besides carbon and hydrogen, such as unsaturated nitro compounds, can also be hydrogenated by the present process, insofar as these elements or groups or conversion products formed therefrom in the hydrogenation operation do not damage the activity of the hydride catalyst employed.

The amount of catalyst present in the hydrogenation may be varied: For example, one volume of catalyst may be used on 340 volumes of charge mixture per hour during three hours. No deactivation of the catalyst could be detected under these conditions even during an eight hour run with an ethylene-hydrogen gas mixture.

In order to increase the surface area of the hydride catalysts employed, it is possible to distribute the same in finely divided condition on suitable high-area supports, such as active charcoal, alumina, or celite. The preparation of such supported metal hydride catalysts can, for example, be carried out by impregnating the high-area support with a liquid ammonia solution of the metal in question, followed by hydriding of the deposited metal, after the ammonia has been pumped off, for example, at a temperature of $-40°$ C. to $-80°$ C. Instead of liquid ammonia, organic amines, such as ethylene diamine, may be used as the solvent of calcium, barium and the like metals in the preparation of the supported metal hydride catalysts. The increase in surface area thus obtained may increase the specific activity of the metal hydrides by as much as a factor of three or more.

Mixtures of the hydrides of two or more alkali and alkaline earth metals may also be used as hydrogenation catalysts, if desired, and in this case, too, these hydrides may be hydrogen-deficient.

Obviously many modifications and variations of the invention as hereinbefore set forth may be made without departing from the spirit and scope thereof, and therefore only such limitations should be imposed as are indicated in the appended claims.

What is claimed is:

1. The process for hydrogenating unsaturated hydrocarbons containing olefinic double bonds which comprises subjecting a mixture of hydrogen and said unsaturated hydrocarbons to the catalytic action of hydrogen-deficient hydrides of metals of the group consisting of the alkali metals and the alkaline earth metals at a temperature in the range of about 50° C. to about 400° C., and at a pressure in the range of about 1 to 50 atmospheres.

2. The process for catalytic hydrogenation of the olefinic double bonds of unsaturated organic compounds, which comprises subjecting such organic compound to the action of added hydrogen under appropriate hydrogenation conditions of space velocity in the range of at least 30 and no more than 1460 v./v./hr., temperatures of at least 0° C. up to 400° C. and hydrogen pressure of 1 to 50 atmospheres in the presence of hydrogen-deficient hydrides of metals of the group consisting of the alkali metals and the alkaline earth metals.

3. The process in accordance with claim 2 wherein hydrogen-deficient barium hydride is employed as the catalyst.

4. The process in accordance with claim 3 wherein said barium hydride is pretreated in vacuo over an extensive period.

5. The process in accordance with claim 2 wherein hydrogen-deficient calcium hydride is employed as the catalyst.

6. The process in accordance with claim 5 wherein said calcium hydride is pretreated in vacuo over an extensive period.

7. The continuous process of catalytic hydrogenation of the olefinic double bonds of unsaturated hydrocarbons, which comprises passing such unsaturated hydrocarbons to be treated and molecular hydrogen over hydrogen-deficient hydride of barium at a temperature in the range of about 0° to 400° C., a hydrogen pressure in the range of about 1–50 atmospheres, and at a space velocity in the range of 350 to 900 v./v./hr.

8. The continuous process of catalytic hydrogenation of the olefinic double bonds of unsaturated monocylic hydrocarbons comprising passing such unsaturated hydrocarbons to be treated and molecular hydrogen over hydrogen-deficient hydride of calcium at a temperature in the range of about 50 to 400° C., a hydrogen pressure in the range of about 1 to 50 atmospheres, and at a relatively low space velocity in the range of about 30 to 50 v./v./hr.

9. The process for the catalytic hydrogenation of normally gaseous olefins which comprises subjecting such olefins in the presence of hydrogen and at hydrogenating conditions, including temperatures in the range of about 0° C. to 400° C. and pressures in the range of about 1 to 50 atmospheres, to contact with a hydrogenation catalyst essentially comprising a hydrogen-deficient hydride of a metal of the group consisting of the alkali metals and the alkaline earth metals.

10. The continuous process of catalytic hydrogenation of the olefinic double bonds of unsaturated organic compounds which comprises passing such compounds to be treated and molecular hydrogen over a catalyst comprising hydrogen-deficient barium hydride, at a temperature in the range of about 0 to 400° C. and at a hydrogen pressure of about 1 to 50 atmospheres.

11. The process in accordance with claim 10 wherein said reactant mixture is passed over hydrogen-deficient barium hydride under the said conditions of temperature and pressure at a space velocity of about 350 to 900 v./v./hr.

12. The continuous process of catalytic hydrogenation of the olefinic double bonds of unsaturated organic compounds which comprises passing such compounds to be treated and molecular hydrogen over a catalyst comprising hydrogen-deficient calcium hydride, at a temperature in the range of about 50 to 400° C. and at a hydrogen pressure of about 1 to 50 atmospheres.

13. The process in accordance with claim 12 wherein said reactant mixture is passed over hydrogen-deficient calcium hydride at a temperature in the range of about 100 to 400° C., a pressure in the range of about 1 to 50 atmospheres and at a space velocity of about 30 to 50 v./v./hr.

14. The process in accordance with claim 1 wherein said hydrogen-deficient metal hydride employed as the catalyst is finely distributed on a support inert under the process conditions.

References Cited in the file of this patent
UNITED STATES PATENTS

| | | |
|---|---|---|
| 1,968,208 | Hugel et al. | July 31, 1934 |
| 2,372,671 | Hansley | Apr. 3, 1945 |
| 2,432,843 | Whitman | Dec. 16, 1947 |
| 2,728,712 | Mayer | Dec. 27, 1955 |

OTHER REFERENCES

"Catalysis" (Berkman et al.), Publ. by Reinhold Publ. Co. (N. Y.), 1940 (pages 565–566 relied on).

UNITED STATES PATENT OFFICE
CERTIFICATE OF CORRECTION

Patent No. 2,854,496

September 30, 1958

Leon W. Wright

It is hereby certified that error appears in the printed specification of the above numbered patent requiring correction and that the said Letters Patent should read as corrected below.

Column 1, line 28, before "molecular" insert -- lower --.

Signed and sealed this 17th day of February 1959.

(SEAL)
Attest:
KARL H. AXLINE
Attesting Officer

ROBERT C. WATSON
Commissioner of Patents